(12) United States Patent
Archambault et al.

(10) Patent No.: US 8,146,070 B2
(45) Date of Patent: *Mar. 27, 2012

(54) METHOD AND APPARATUS FOR OPTIMIZING SOFTWARE PROGRAM USING INTER-PROCEDURAL STRENGTH REDUCTION

(75) Inventors: Roch Georges Archambault, New York (CA); Shimin Cui, Toronto (CA); Raul Esteban Silvera, Woodbridge (CA)

(73) Assignee: International Business Machines Corporation, Armonk, NY (US)

( * ) Notice: Subject to any disclaimer, the term of this patent is extended or adjusted under 35 U.S.C. 154(b) by 700 days.

This patent is subject to a terminal disclaimer.

(21) Appl. No.: 12/270,707

(22) Filed: Nov. 13, 2008

(65) Prior Publication Data

US 2009/0106745 A1    Apr. 23, 2009

Related U.S. Application Data

(63) Continuation of application No. 10/930,038, filed on Aug. 30, 2004, now Pat. No. 7,472,382.

(51) Int. Cl.
*G06F 9/45* (2006.01)
(52) U.S. Cl. .................... 717/157; 717/144
(58) Field of Classification Search .......... None
See application file for complete search history.

(56) References Cited

U.S. PATENT DOCUMENTS

| | | | |
|---|---|---|---|
| 5,671,419 A | 9/1997 | Carini et al. | |
| 5,778,212 A * | 7/1998 | Dehnert et al. | 717/155 |
| 5,812,855 A | 9/1998 | Hiranandani et al. | |
| 5,850,549 A | 12/1998 | Blainey et al. | |
| 5,978,588 A | 11/1999 | Wallace | |
| 6,059,839 A * | 5/2000 | Dehnert et al. | 717/154 |
| 6,173,444 B1 | 1/2001 | Archambault | |
| 6,286,135 B1 | 9/2001 | Santhanam | |
| 6,675,368 B2 | 1/2004 | Takayanagi et al. | |
| 6,675,378 B1 | 1/2004 | Schmidt | |
| 6,675,379 B1 * | 1/2004 | Kolodner et al. | 717/155 |
| 6,738,967 B1 | 5/2004 | Radigan | |
| 7,062,759 B2 * | 6/2006 | Robison | 717/141 |
| 7,165,245 B2 * | 1/2007 | Robison | 717/145 |
| 7,213,242 B2 * | 5/2007 | Robison | 717/151 |
| 7,472,382 B2 * | 12/2008 | Archambault et al. | 717/157 |
| 7,555,748 B2 * | 6/2009 | Archambault et al. | 717/158 |
| 7,590,978 B2 * | 9/2009 | Chang et al. | 717/155 |

(Continued)

OTHER PUBLICATIONS

Luiz de Rose and David Padua, Techniques for the Translation of MATLAB Programs into Fortran 90 [online], Mar. 1999 [retrieved on Nov. 2011], pp. 286-323. Retrieved from the Internet: <URL:http://delivery.acm.org/10.1145/320000/316693/p286-de_rose.pdf?>.*

(Continued)

*Primary Examiner* — Tuan Dam
*Assistant Examiner* — Hanh Bui
(74) *Attorney, Agent, or Firm* — Yee & Associates, P.C.; John D. Flynn

(57) ABSTRACT

Inter-procedural strength reduction is provided by a mechanism of the present invention to optimize software program. During a forward pass, the present invention collects information of global variables and analyzes the information to select candidate computations for optimization. During a backward pass, the present invention replaces costly computations with less costly or weaker computations using pre-computed values and inserts store operations of new global variables to pre-compute the costly computations at definition points of the global variables used in the costly computations.

2 Claims, 9 Drawing Sheets

U.S. PATENT DOCUMENTS

| | | | |
|---|---|---|---|
| 7,765,534 B2* | 7/2010 | Archambault et al. | 717/154 |
| 7,818,731 B2* | 10/2010 | Archambault et al. | 717/140 |
| 2002/0010911 A1 | 1/2002 | Cheng et al. | |
| 2002/0095667 A1* | 7/2002 | Archambault | 717/154 |
| 2002/0095669 A1* | 7/2002 | Archambault | 717/157 |
| 2002/0162096 A1* | 10/2002 | Robison | 717/145 |
| 2002/0184615 A1 | 12/2002 | Sumner et al. | |
| 2003/0177472 A1 | 9/2003 | de Jong | |
| 2004/0015903 A1 | 1/2004 | Robison | |
| 2004/0128659 A1* | 7/2004 | Robison | 717/153 |
| 2005/0246700 A1* | 11/2005 | Archambault et al. | 717/156 |
| 2006/0048103 A1* | 3/2006 | Archambault et al. | 717/131 |
| 2006/0048117 A1* | 3/2006 | Archambault et al. | 717/151 |

OTHER PUBLICATIONS

Amarasinghe et al., Strength Reduction of Integer Division and Modulo Operations [online], Nov. 1999 [retrieved on Nov. 2011], pp. 1-17. Retrieved from the Internet: <URL: http://publications.csail.mit.edu/lcs/pubs/pdf/MIT-LCS-TM-600.pdf>.*

Bentley, Jon, "Programming Pearls", Second Edition, Appendix 4, 2000, Addison-Wesley, Inc., pp. 1-4, <http://www.cs.bell-labs.com/cm/cs/pearls/index.html>.

Amarasinghe et al., "Strength Reduction of Integer Division and Modulo Operations", M.I.T. Laboratory for Computer Science, Nov. 1999, pp. 1-17.

Duesterwald et al., "A Practical Framework for Demand-Driven Interprocedural Data Flow Analysis", ACM Transactions on Programming Languages and Systems, vol. 19, No. 6, Nov. 1997, pp. 992-1030.

Debray et al., "Interprocedural Control Flow Analysis of First-Order Programs with Tail-Call Optimization", ACM Transactions on Programming Languages and Systems, vol. 19, No. 4, Jul. 1997, pp. 568-585.

Pechtchanski et al., "Dynamic Optimistic Interprocedural Analysis: a Framework and an Application", ACM Digital Library, 2001, 99. 195-210.

Ryder et al., "A Schema for Interprocedural Modification Side-Effect Analysis with Pointer Aliasing", ACM Transactions on Programming Languages and Systems, vol. 23, No. 2, Mar. 2001, pp. 105-106.

* cited by examiner

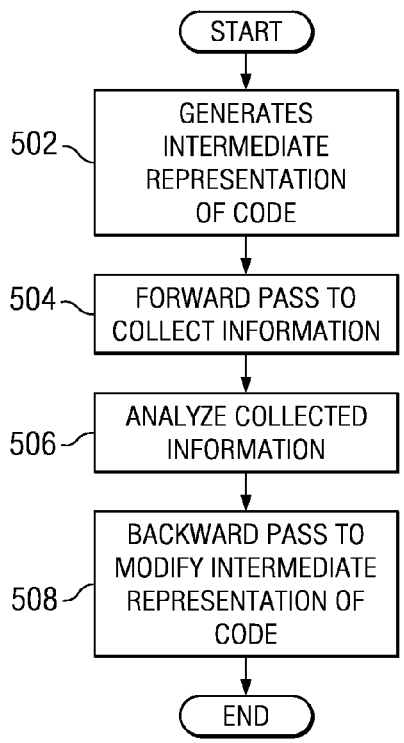
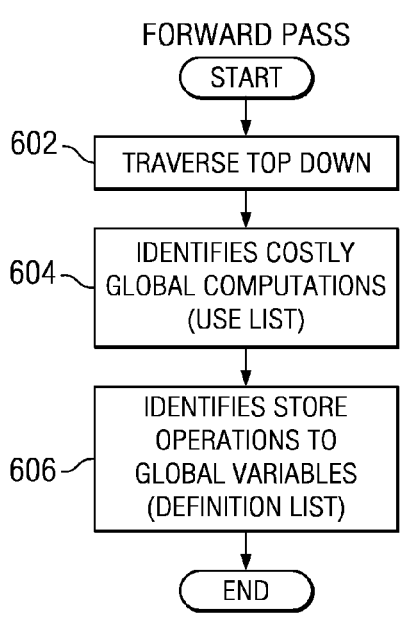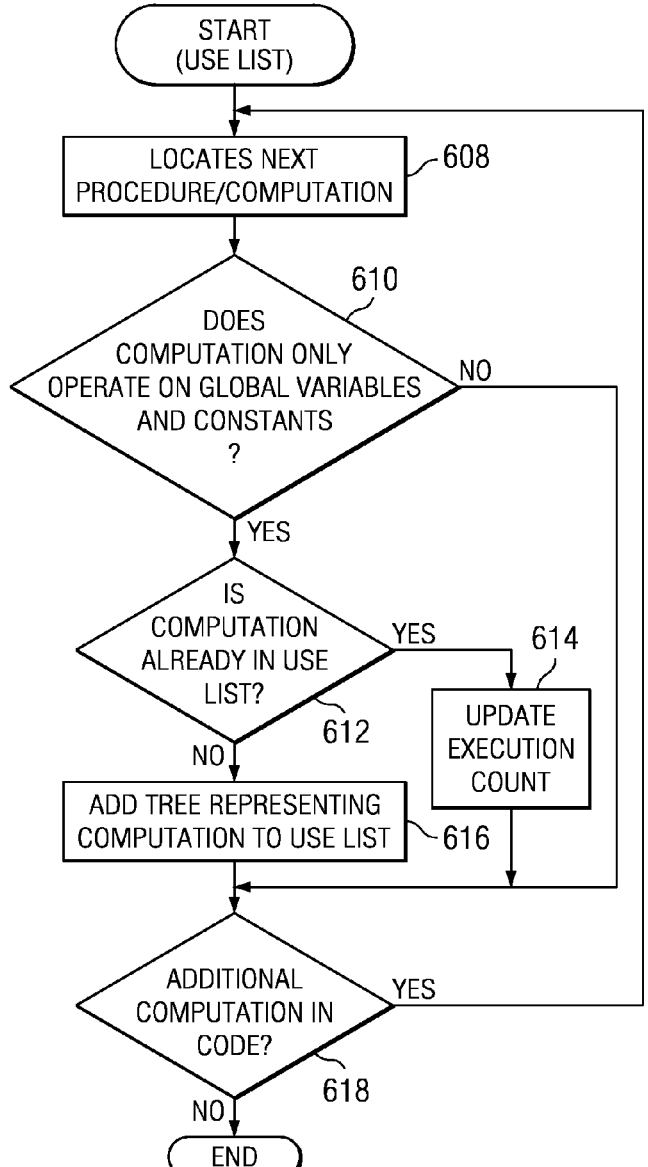

ANALYZE COLLECTED INFORMATION

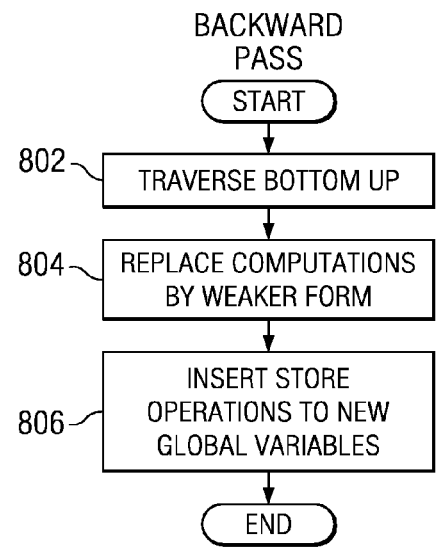
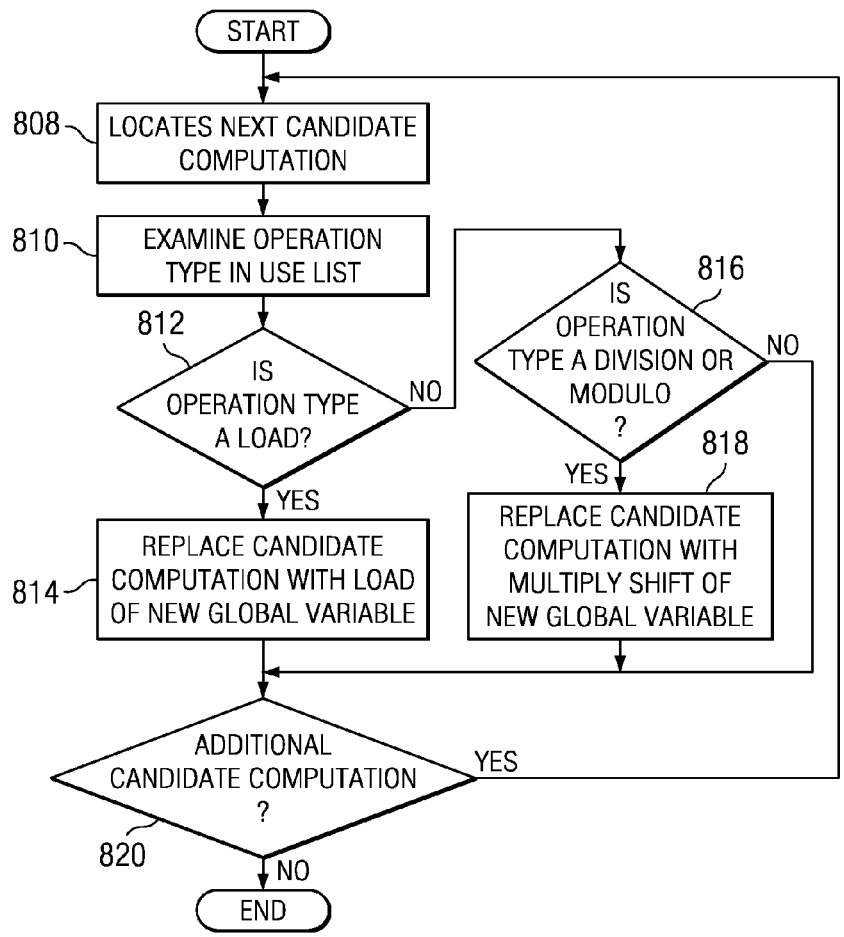

```
          ⎧              ⎧ init {
          ⎪              ⎪    a = ...
          ⎪        902 ⎨      b = ...
          ⎪              ⎪    c = ...
          ⎪              ⎪    d = ...                // execute count: 1
          ⎪              ⎩ }
          ⎪
          ⎪              ⎧ bar {
          ⎪              ⎪   ...
          ⎪              ⎪   for (int i = 0; i < 1000; ++i) {
          ⎪              ⎪        ...
          ⎪        904 ⎨  906 ⎨ 908 — x += expr(a, b)    // execute count: 1000
          ⎪              ⎪         910 — y += c/d
FIG. 9 ⎨                ⎪         ...
          ⎪              ⎪         912 — foo () ;
          ⎪              ⎪         ...
          ⎪              ⎪      }
   900 ⎯⎯⎯            ⎩ }
          ⎪
          ⎪              ⎧ foo () {
          ⎪              ⎪    ...
          ⎪              ⎪    if (cond) {
          ⎪              ⎪        b = ...
          ⎪              ⎪        d = ...              // execute count: 10
          ⎪        914 ⎨      }
          ⎪              ⎪    ...
          ⎪              ⎪    c = ...                  // execute count: 1000
          ⎪              ⎪    ...
          ⎩              ⎩ }
```

```
   1002 ⎯ [0] id = a, count = 1
   1004 ⎯ [1] id = b, count = 11          ⎫
   1006 ⎯ [3] id = c, count = 1001        ⎬ FIG. 10A
   1008 ⎯ [4] id = d, count = 11          ⎭  ⎯ 1000
```

```
              1026       1028
                \         /
   1022 ⎯ [0] tree = expr(a,b), count = 1000, id = 0     ⎫
   1024 ⎯ [1] tree = c/d, count = 1000, id = 0           ⎬ FIG. 10B
                /           \                             ⎭  ⎯ 1020
              1030         1032
```

1102 — [0] tree = expr(a, b), count = 1000, id = isr1, type = load
1104 — [1] tree = c/d, count = 1000, id = 0, type = invalid
1106 — [1] tree = 1/d, count = 1000, id = isr2, type = div_magic 1112 above "id ="; 1114 above "type ="; 1115 below "tree"; 1116 below "id ="; 1118 below "type ="

```
init {
    a = ...
    b = ...
1202— isr1 = expr(a, b)           // execute count: 1
    c = ...
    d = ...

1204— isr2 = (magic_num(d), shift(d))   // execute count: 1
}
```
1201

```
bar {
    ...
    for (int i = 0; i < 1000; ++i) {
        ...
1208— x += isr1                   // execute count: 1000
1210— y += (c*magic_num(d))>>shift(d)  // execute count:1000
        ...
        foo ();
        ...
    }
}
```
1206

```
foo () {
    ...
    if (cond) {
        b = ...
1214— isr1 = expr(a, b)           // execute count: 10
        d = ...
1216— isr2 = (magic_num(d), shift(d))   // execute count: 10
    }
    ...
    c = ...                       // execute count: 1000
    ...
}
```
1212

METHOD AND APPARATUS FOR OPTIMIZING SOFTWARE PROGRAM USING INTER-PROCEDURAL STRENGTH REDUCTION

CROSS REFERENCE TO RELATED APPLICATION

The present invention is related to an application entitled Method and Apparatus for Improving Data Cache Performance Using Inter-Procedural Strength Reduction of Global Objects, filed even date hereof, assigned to the same assignee, and incorporated herein by reference.

This application is a continuation of application Ser. No. 10/930,038, filed Aug. 30, 2004 now U.S. Pat. No. 7,472,382, status allowed.

BACKGROUND OF THE INVENTION

1. Technical Field

The present invention relates to an improved data processing system. In particular, the present invention relates to optimizing software program in a compiler of a data processing system. Still more particularly, the present invention relates to optimizing software program in a compiler of a data processing system using inter-procedural strength reduction.

2. Description of Related Art

A compiler is a program that executes in a data processing system, which translates a high-level language program into a functionally equivalent low-level language program, such as machine language instructions. In the process of compilation, the compiler optimizes the source program by generating an explicit intermediate representation and performing code optimization.

Currently, well-known code optimization techniques, such as strength reduction, are used by many compilers to optimize code. Strength reduction includes reformulating certain costly computations in terms of less expensive ones. For example, by replacing certain repeated multiplications with repeated additions inside a loop containing array references may increase performance of loop execution. This increase in performance is due to reduction in total number of operations in the loop with the use of less costly operations. However, strength reduction is restricted to optimizing code of a single procedure, that is, intra-procedurally.

Another well known code optimization technique is introduced by Chauhan and Kennedy, which reduces a library procedure in strength by splitting the procedure based on the call arguments. The library procedure is split into two component procedures. An initialization part in which computations depend only on loop invariant arguments and can be moved outside the loop. Another part depends on loop index and remains inside the loop.

In addition to implementing the above well known techniques, most modern compilers are also designed to utilize multiple passes of the source program to collect information that can be used for code optimization, for example, a two pass inter-procedural analysis. A first pass is performed at compile time to collect summary information for each procedure compiled. A second pass is performed at link time and uses information collected in the first pass to compute a solution that improves structure of code produced by the compiler.

However, a need exists for a solution that takes the information collected in the two passes and analyzes it to select costly computations that are candidates for strength reduction across procedures in a source program.

Therefore, it would be advantageous to have an improved method and apparatus for a solution that pre-computes computation costs and reduces costly computations in strength inter-procedurally, that is, optimizing code in more than one procedure, such that performance of compiled code execution may be improved.

SUMMARY OF THE INVENTION

A method, apparatus and computer instructions is provided for optimizing software program using inter-procedural strength reduction. The mechanism of the present invention identifies costly computations of a source program using information collected during forward pass. Based on cost analysis, the present invention generates global variables to maintain values of the costly computations. During backward pass, the present invention modifies the intermediate representation of the code by replacing the costly computations with less costly or weaker computations using pre-computed values and inserting store operations of the new global variables to pre-compute the costly computations at definition points of the global variables used in the costly computations.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flowchart of a process for optimizing software program using inter-procedural strength reduction in accordance with a preferred embodiment of the present invention;

FIG. 6A is a flowchart of a process for collecting information during a forward pass in accordance with a preferred embodiment of the present invention FIG. 6B is a flowchart of a process for generating a use list is accordance with a preferred embodiment of the present invention;

FIG. 8A is a flowchart of a process for modifying intermediate representation of code during backward pass in accordance with a preferred embodiment of the present invention;

FIG. 8B is a flowchart of a process for replacing selected computations with less costly or weaker computations in accordance with a preferred embodiment of the present invention;

FIG. 9 is a diagram illustrating an exemplary source program prior to inter-procedural strength reduction in accordance with a preferred embodiment of the present invention;

FIG. 10A is a diagram illustrating an exemplary def list generated for source program 900 in FIG. 9 in accordance with a preferred embodiment of the present invention;

FIG. 10B a diagram illustrating an exemplary use list generated for source program 900 in FIG. 9 in accordance with a preferred embodiment of the present invention;

FIG. 11 is a diagram illustrating an updated use list with selected candidate computations in accordance with a preferred embodiment of the present invention; and FIG. 12 is a diagram illustrating optimized program for source program 900 in FIG. 9 in accordance with a preferred embodiment of the present invention.

DETAILED DESCRIPTION OF THE PREFERRED EMBODIMENT

Figure 1:
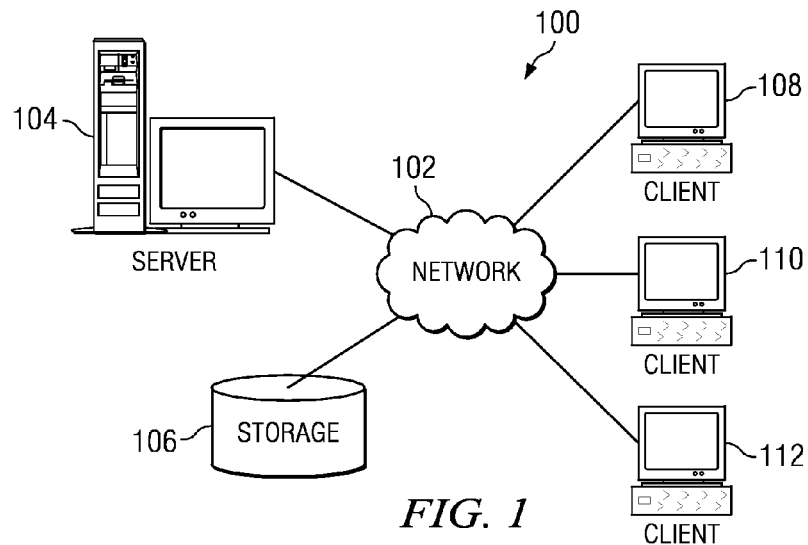
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
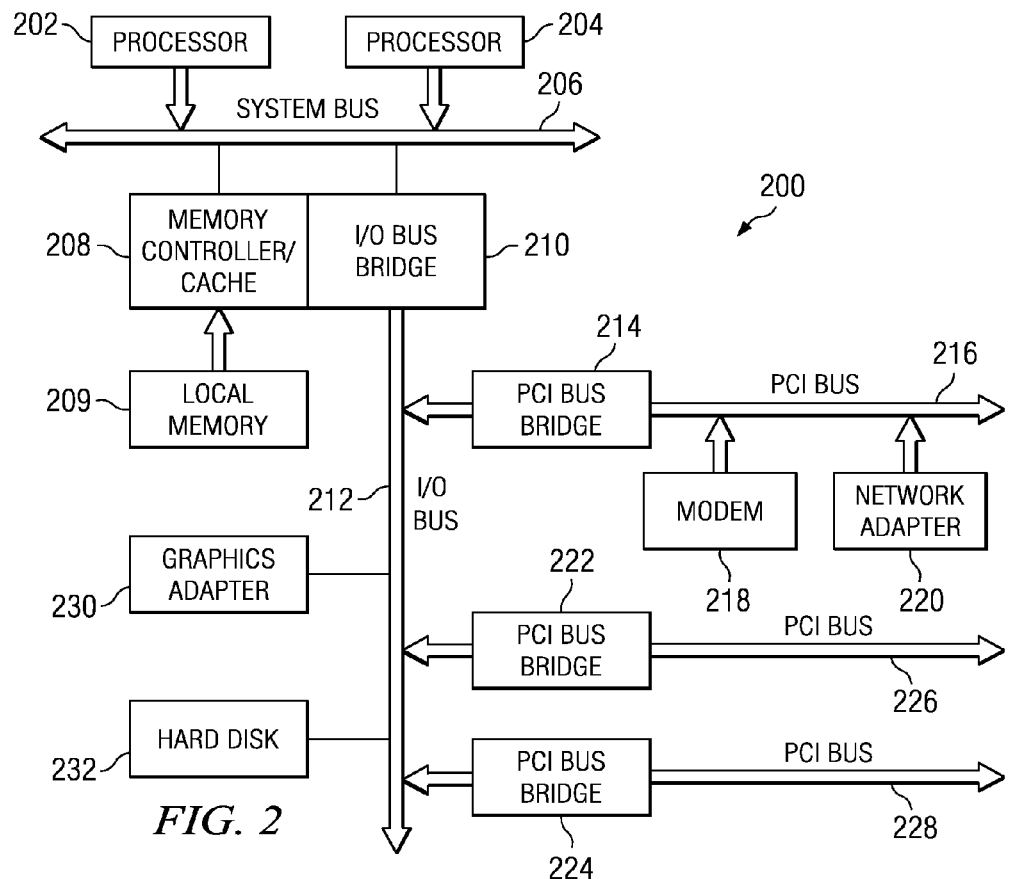
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
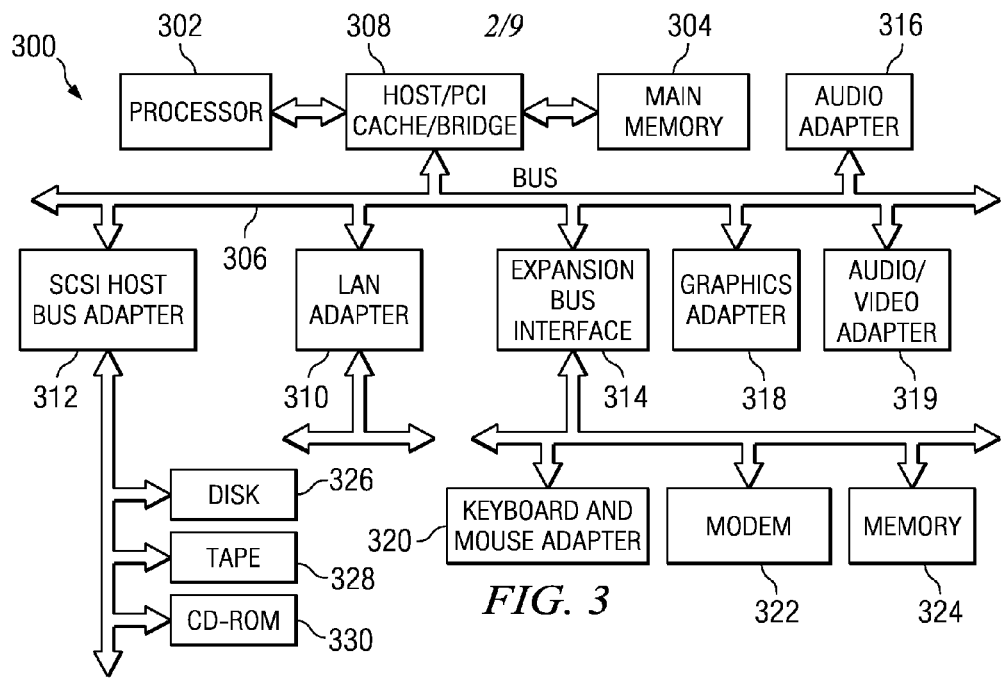
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used, Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus and computer instructions for optimizing software program using inter-procedural strength reduction. The mechanism of the present invention is implemented during a link phase of a compiler that generates an intermediate representation. The intermediate representation may be a control flow graph, a call graph, or a data flow graph. A call graph is a directed multi-graph that includes nodes representing procedures in the compiled code and edges representing call points.

The mechanism of the present invention then performs a two-pass analysis by traversing the call graph in the intermediate representation. During the forward pass, the mechanism of the present invention traverses the call graph in reverse depth-first or top-down order to collect definition and use information of global variables in the software program. Definition information keeps track of stores of all global variables in the program. Use information keeps track of costly computations that are candidates for cost pre-computation.

Once definition and use information are collected, the mechanism of the present invention analyzes the information at the end of the forward pass after all nodes in the call graph have been traversed. This analysis includes identifying candidate computations for strength reduction based on cost analysis of the whole program. Cost analysis refers to computation of execution cost, which may be, for example, the execution count in a flow-insensitive analysis or weights assigned for each global variable store based on reaching-definition and reached-use information obtained from control flow and data flow analysis.

The present invention identifies candidate computations by comparing an execution cost of each computation in the use information with the execution cost of each global variable referenced in the computation using definition information. The candidate computation may be determined to be of benefit for optimization if the global variables referenced by the candidate computation are rarely modified compared to the candidate computation itself. Once candidate computations are identified, the mechanism of the present invention creates a global variable for each selected computation and initializes the global variable if all the global variables in the computation have initialized values.

After global variables are created and initialized, the mechanism of the present invention modifies the intermediate representation of the code being compiled during the backward pass. The mechanism of the present invention traverses the call graph of the intermediate representation of the code in a depth-first or bottom-up order. Each selected computation is replaced by a less costly or weaker computation, such as a load of the created global variables. The mechanism of the present invention then inserts store operations of newly created global variables at definition points of all the global variables used in the selected computations.

Thus, the present invention provides an inter-procedural strength reduction method that improves the performance of the execution of compiled code. The present invention analyzes the execution cost of computations in a source program and determines if costly computations are candidates for optimization. The present invention then inter-procedurally replaces costly computations with less costly or weaker computations to reduce the total number of costly computations in the program.

Figure 4:
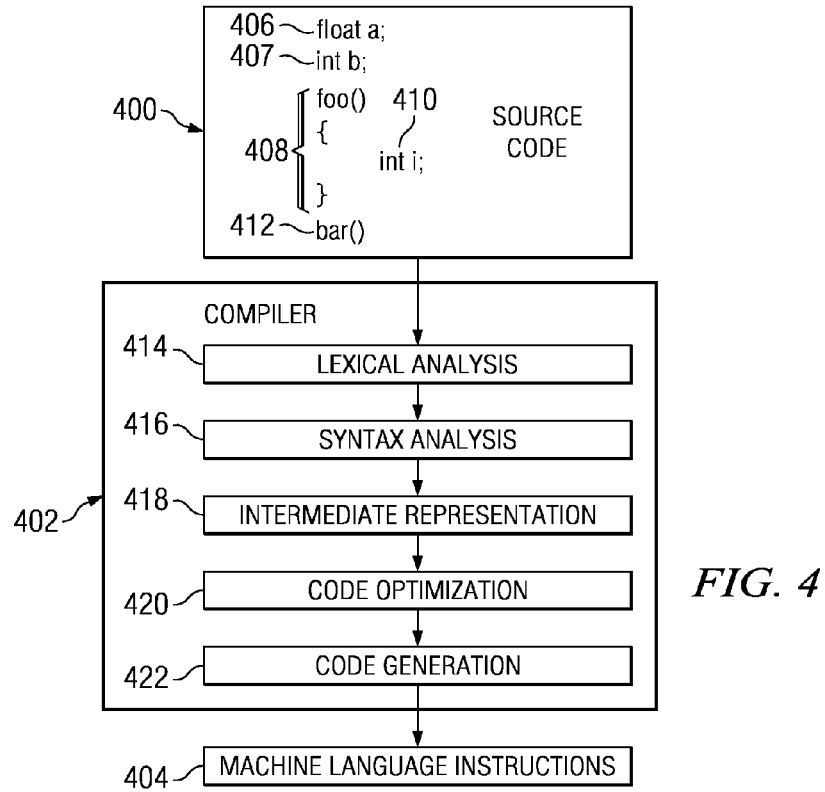
FIG. 4 is a diagram illustrating relationships between a source program, a compiler, and machine language instructions in a preferred embodiment of the present invention.

Turning now to FIG. 4, a diagram illustrating relationships between a source program, a compiler, and machine language instructions is depicted in a preferred embodiment of the present invention. As illustrated in FIG. 4, in this illustrative example, a user, such as a programmer, may define source program 400. Source program 400 includes variables and procedures.

Variables may be global or local in these examples. Global variables are accessible by any procedure within source program 400. In this example, variable a 406 is defined as a float and variable b 407 is defined as an integer. Variable a 406 and variable b 407 are both accessible by procedure foo 408 and procedure bar 412. Within a procedure, local variables may be present. In this example, variable i 410 is defined as an integer in procedure foo 408 and is only accessible within procedure foo 408.

Once source program 400 is defined, a programmer may compile source program 400 using compiler 402. Compiler 402 may be implemented in a data processing system, such as data processing system 200 in FIG. 2 or data processing system 300 in FIG. 3. In the compilation process, compiler 402 processes source program 400 in several phases: lexical analysis phase 414, syntax analysis phase 416, intermediate representation phase 418, code optimization phase 420, and code generation phase 422.

Lexical analysis phase 414 analyzes source program 400. In this phase, compiler 402 reads characters in source program 400 and groups them into streams of tokens representing logically cohesive sequence of characters, such as identifiers, operators, and keywords.

Syntax analysis 416 imposes a hierarchy structure on the token string. During syntax analysis 416, compiler 402 obtains the string of tokens from lexical analysis 414 and determines whether the string is a valid construct of the source language by either performing top-down parsing or bottom-up parsing.

Once lexical and syntax analysis are complete, compiler 402 generates an explicit intermediate code representation 418 of source program 400, which may take a variety of forms. For example, an intermediate code representation may be a call graph, a data flow graph, or a control flow graph. In a preferred embodiment, the mechanism of the present invention performs a two-pass traversal of a call graph generated by compiler 402. However, other intermediate representation may also be used.

In code optimization phase 420, compiler 402 performs various transformations in order to improve intermediate code. These transformations include loop transformations, such as, loop tiling and strip mining. These transformations improve performance of the target machine code.

Finally, compiler 402 generates target machine code by selecting memory locations for each variable used by the program. Each intermediate instruction is translated into a sequence of machine language instructions, such as machine language instructions 404 that performs the same task. Machine language instructions 404 may be for a specific platform, such as, a UNIX platform. A programmer may then execute these instructions on the specific platform with improved performance.

Turning now to FIG. 5, a flowchart of a process for optimizing software program using inter-procedural strength reduction is depicted in accordance with a preferred embodiment of the present invention. The process begins when the compiler, such as compiler 402 in FIG. 4, generates an intermediate code representation of the source program (step 502). The intermediate representation generated may be a call graph, a control flow graph, or a data flow graph.

Next, the mechanism of the present invention collects information including use and definition information of global variables during a forward pass (step 504). A forward pass is traversing the call graph in a reverse depth-first or top down order. Once information is collected, the mechanism of the present invention analyzes the collected information at the end of the forward pass after all nodes of the call graph are traversed (step 506).

Finally, the mechanism of the present invention modifies the intermediate representation of the code being compiled during a backward pass (step 508). A backward pass is traversing the call graph in a depth-first or bottom up order. The process then terminates thereafter. By using a two-pass analysis, redundant computations are avoided by performing incremental updates of reference marking with a minimal number of computations per procedure.

Turning now to FIG. 6A, a flowchart of a process for collecting information during a forward pass is depicted in accordance with a preferred embodiment of the present invention. The flowchart of FIG. 6A is a more detailed description of 504 in FIG. 5. As depicted in FIG. 6A, the process begins when the mechanism of the present invention traverses in reverse depth-first or top down order (step 602) of the intermediate representation generated by the compiler.

Next, the mechanism of the present invention identifies costly computations which operate only on global variables (step 604). This step includes collecting execution cost related information in the intermediate representation of the code being compiled. A data structure, herein referred to as a use list, is generated by the mechanism of the present invention to store the collected use information.

After a use list is generated, the mechanism of the present invention identifies store operations where global variables are modified (step 606). This step includes collecting execution cost related information in the intermediate representation of the code being generated. A data structure, herein referred to as a def list, is generated by the mechanism of the present invention to store the collected definition information. Once a def list is generated, the process terminates thereafter.

Turning now to FIG. 6B, a flowchart of a process for generating a use list is depicted in accordance with a preferred embodiment of the present invention. The flowchart in FIG. 6B is a more detailed description of step 604 in FIG. 6A. As depicted in FIG. 6B, the process begins when the mechanism of the present invention traverses the call graph and locates the next defined procedure, which may be a computation (step 608).

A defined procedure is a procedure that has a corresponding intermediate representation. If an intermediate representation for a procedure is not available, the procedure is identified as an undefined procedure. An example of an undefined procedure includes a procedure of which the assembler code is linked to the compiled code.

Next, the mechanism of the present invention determines whether the computation only operates on global variables and constants (step 610). If the computation does not operate on global variables and constants, the process continues to step 618. Otherwise, the mechanism of the present invention determines whether the computation is already in the use list (step 612). If the computation is already in the use list, the mechanism of the present invention updates the execution count of the computation in the use list (step 614) and the process continues to step 618. Otherwise, the mechanism of the present invention adds a tree entry representing the computation to the use list (step 616) and the process continues to step 618.

At step 618, the mechanism of the present invention determines whether additional defined procedures or computations exist in the intermediate representation of the code being compiled. If additional defined procedures or computations exist, the process returns to step 608 to the next computation. Otherwise, the process terminates thereafter.

Figure 6C:
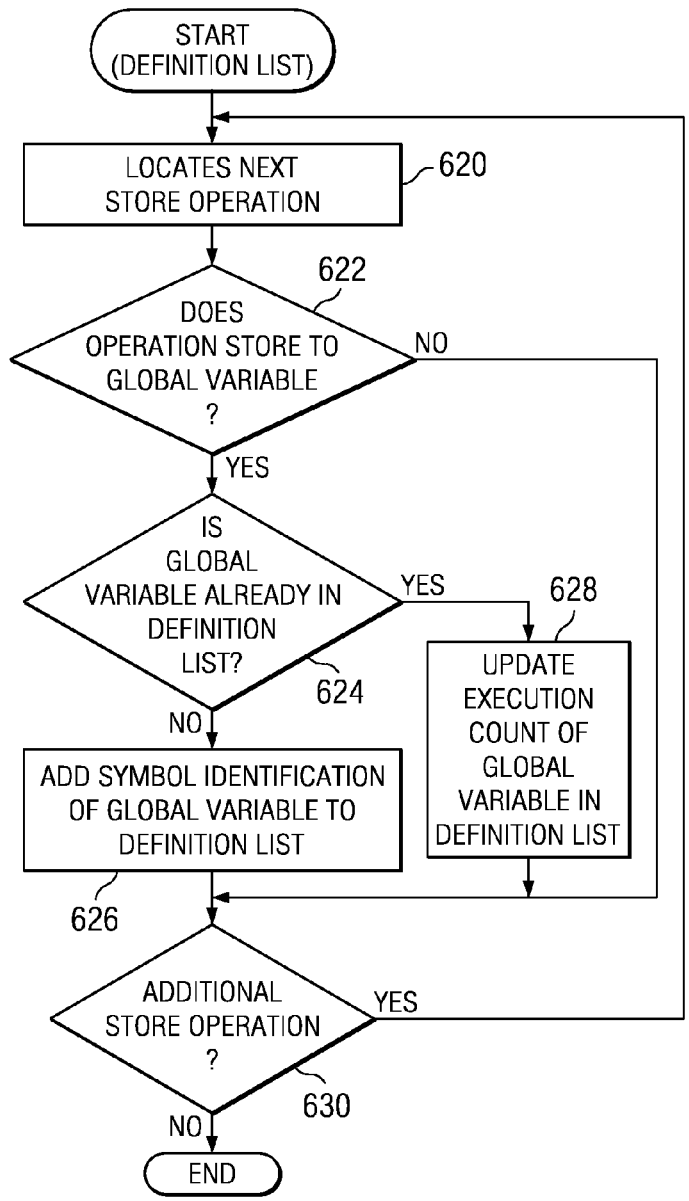
FIG. 6C is a flowchart of a process for generating a def list in accordance with a preferred embodiment of the present invention.

Turning next to FIG. 6C, a flowchart of a process for generating a def list is depicted in accordance with a preferred embodiment of the present invention. The flowchart in FIG. 6C is a more detailed description of step 606 in FIG. 6A. As depicted in FIG. 6C, the process begins when the mechanism of the present invention traverses the call graph and locates the next store operation (step 620). A store operation is an operation that stores a value to a variable, for example, a=1.

Next, the mechanism of the present invention determines whether the store operation stores to a global variable (step 622). The determination is made by examining the variable being stored in the store operation. If the store operation does not store to a global variable, the process continues to step 630. If the process stores to a global variable, the mechanism of the present invention determines whether the global variable being stored is already in the def list (step 624).

If the global variable is already in the def list, the mechanism of the present invention updates the execution count of the global variable in the def list (step 628) and the process continues to step 630. Otherwise, the mechanism of the present invention adds a symbol identification of the global variable to the def list (step 626) and the process continues to step 630.

At step 630, the mechanism of the present invention determines whether additional store operation exists in the intermediate representation of the code being compiled. If additional store operation exists, the process returns to step 620 to the next computation. Otherwise, the process terminates thereafter.

Figure 7A:
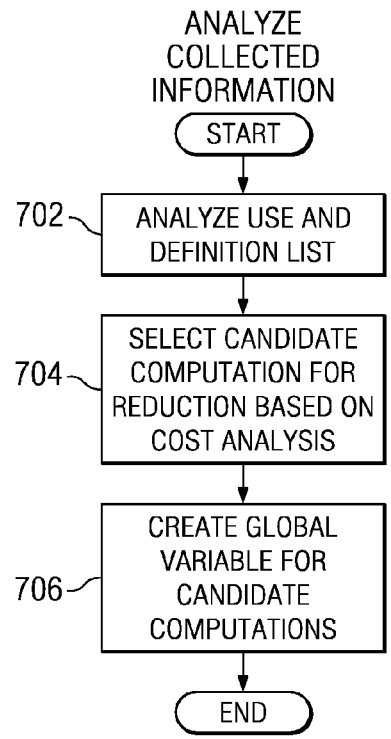
FIG. 7A is a flowchart of a process for analyzing collected information in accordance with a preferred embodiment of the present invention.

Turning now to FIG. 7A, a flowchart of a process for analyzing collected information is depicted in accordance with a preferred embodiment of the present invention. The flowchart in FIG. 7A is a more detailed description of step 506 in FIG. 5. As depicted in FIG. 7A, the process begins when the mechanism of the present invention analyzes the use list and def list that are generated using processes in FIGS. 6B and 6C

(step 702). Next, the mechanism of the present invention selects candidate computations for strength reduction based on cost analysis of the whole program (step 704).

Once candidate computations are selected, the mechanism of the present invention creates a global variable for each selected computation (step 706). This step includes initializing the global variable if all the global variables in the computation have initialization values. Thus, the process terminates thereafter.

Figure 7B:
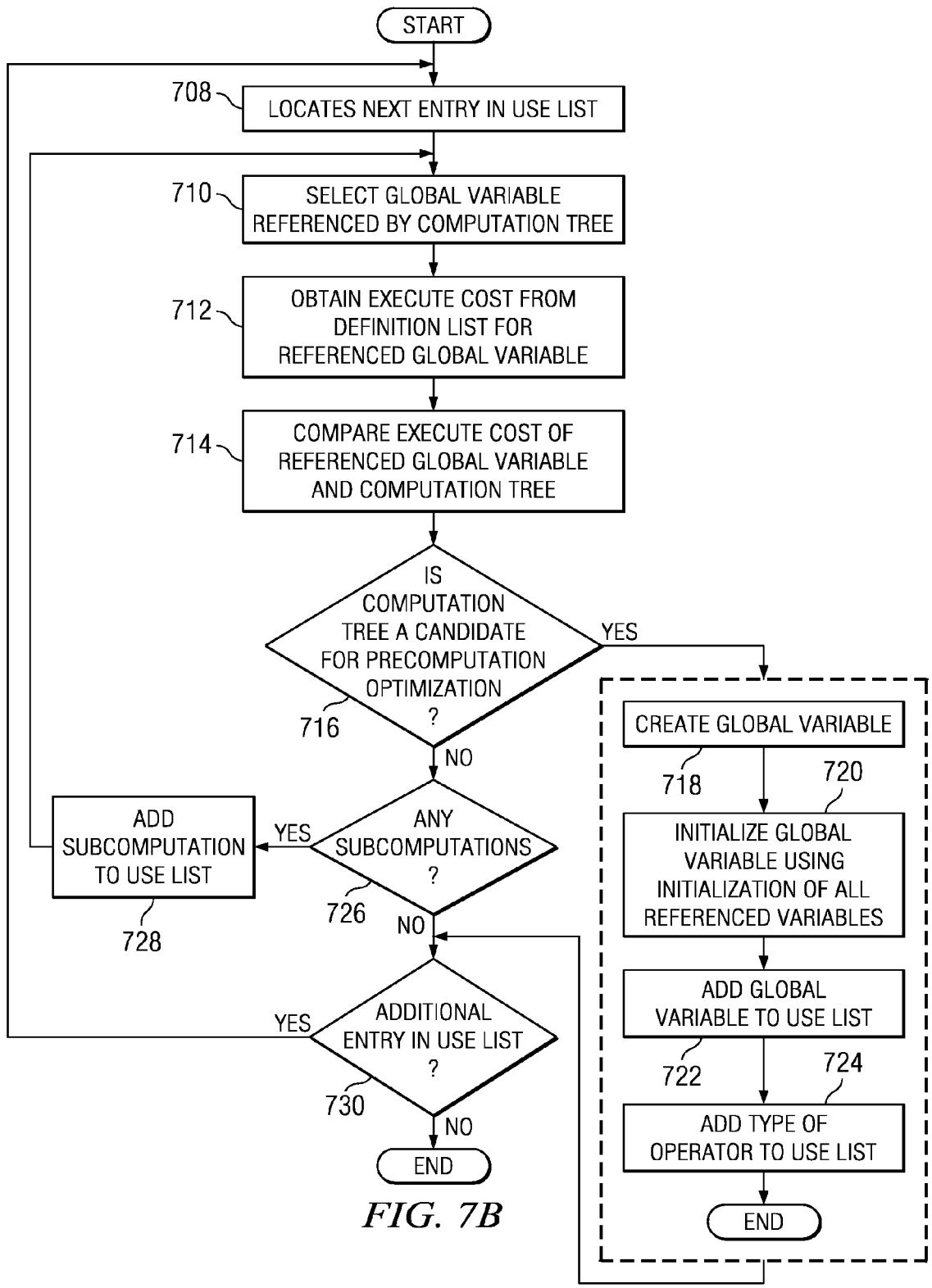
FIG. 7B is a flowchart of a process for selecting candidate computations for strength reduction based on cost analysis and creating global variables for candidate computations in accordance with a preferred embodiment of the present invention.

Turning now to FIG. 7B, a flowchart of a process for selecting candidate computations for strength reduction based on cost analysis and creating global variables for candidate computations is depicted in accordance with a preferred embodiment of the present invention. This process describes steps 704 and 706 in FIG. 7A in further detail. As depicted in FIG. 7B, the process begins when the mechanism of the present invention locates the next entry in the use list (step 708). Next, the mechanism of the present invention selects a global variable that is referenced by the tree computation (step 710) and obtains the execution cost from the def list corresponding to the referenced global variable (step 712). For flow-insensitive analysis, the execution cost may be the execution count. For flow-sensitive analysis, the execution cost may be weights assigned for each global variable store. The weights are determined based on reaching-definition and reached-use information obtained from control flow and data flow analysis. The execution cost of the referenced global variable is compared to the computation tree (step 714).

After the execution cost is obtained, the mechanism of the present invention determines whether the tree computation is a candidate for pre-computation optimization (step 716). This step includes determining if the execution cost of the tree computation is significantly higher than the execution cost of the referenced global variable. In other words, pre-computation of the computation may be of benefit if the global variables referenced by the computation are rarely modified compared to the computation itself.

If the tree computation is a candidate for pre-computation optimization, the mechanism of the present invention creates a new global variable (step 718) and initializes the new global variable using initial values of all the referenced global variables (step 720). For example, if the new variable is isr1 and isr1 references global variables a and b, isr1 is then initialized with the initial values of a and b. Once the new global variable is initialized, the mechanism of the present invention adds the new global variable to the use list (step 722) and the type of operation corresponding to the tree computation to the use list (step 724). The process continues to step 730.

Turning back to step 716, if the tree computation is not a candidate for pre-computation optimization, the mechanism of the present invention determines whether the tree computation includes any sub-computation (step 726). If sub-computation exists, the mechanism of the present invention adds the sub-computation to the use list (step 728) and returns to step 710 to further analyze the sub-computation. If no sub-computation exists, the process continues to step 730.

At step 730, the mechanism of the present invention determines whether additional entries exist in the use list. If additional entries exist, the process returns to step 708 to obtain the next entry. Otherwise, the process terminates thereafter.

Turning now to FIG. 8A, a flowchart of a process for modifying intermediate representation of code during backward pass is depicted in accordance with a preferred embodiment of the present invention. The flowchart of FIG. 8A is a more detailed description of step 508 in FIG. 5. As depicted in FIG. 8A, the process begins when the mechanism of the present invention traverses in depth-first or bottom up order (step 802) of the intermediate representation generated by the compiler.

Next, the mechanism of the present invention replaces each candidate computation selected using the process in FIG. 7B by a weaker or less costly computation (step 804), such as a load of the created global variable. This step replaces all occurrences of selected costly computations in the whole program with less costly or weaker computations.

Then, the mechanism of the present invention inserts a store operation of each global variable referenced by selected computations at all of its definition points in the whole program (step 806). Thus, the process terminates thereafter.

Turning now to FIG. 8B, a flowchart of a process for replacing selected computations with less costly or weaker computations is depicted in accordance with a preferred embodiment of the present invention. The flowchart of FIG. 8B is a more detailed description of step 804 in FIG. 8A. As depicted in FIG. 8B, the process begins when the mechanism of the present invention locates the next selected candidate computation (step 808).

Next, the mechanism of the present invention examines the type of operation in the use list (step 810) and determines whether the type of operation of the selected candidate computation is a load operation (step 812). If the type is a load operation, the mechanism of the present invention replaces the selected candidate computation with a load of the newly created global variable (step 814) and the process continues to step 820. Otherwise, the mechanism of the present invention determines whether the type of operation is a division or modulo operation (step 816). Division or modulo operations are more complex operations. Other types of operations may also be determined by the mechanism of the present invention.

If the type is a division or modulo operation, the selected candidate computation is replaced by a multiply-shift of the newly created global variable (step 818) and the process continues to step 820. If the operation type is not a division or modulo operation, the process also continues to step 820.

At step 820, the mechanism of the present invention determines whether additional selected candidate computation exists. If additional selected candidate computation exists, the process returns to step 808 to locate the next selected candidate computation. Otherwise, the process terminates thereafter.

Figure 8C:
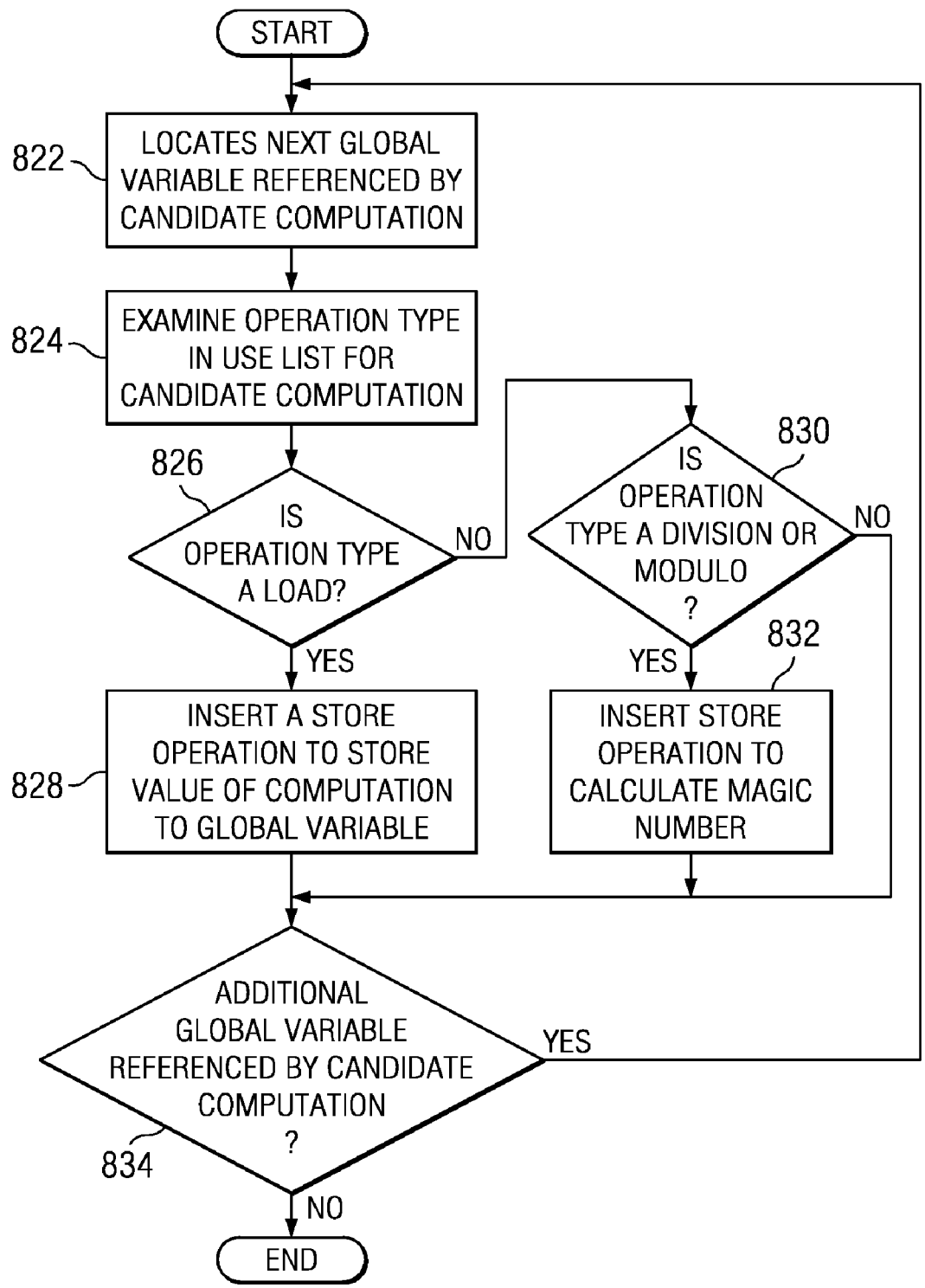
FIG. 8C is a flowchart of a process for inserting store operation for each global variable referenced by a selected candidate computation in accordance with a preferred embodiment of the present invention.

Turning next to FIG. 8C, a flowchart of a process for inserting store operation for each global variable referenced by a selected candidate computation is depicted in accordance with a preferred embodiment of the present invention. The flowchart of FIG. 8C is a more detailed description of step 806 in FIG. 8A. As depicted in FIG. 8C, the process begins when the mechanism of the present invention locates the next global variable referenced by a selected candidate computation (step 822).

Next, the mechanism of the present invention examines the type of operation in the use list corresponding to the selected candidate computation (step 824) and determines whether the operation type is a load operation (step 826). If the operation type is a load operation, the mechanism of the present invention inserts a store operation to store a value of the selected candidate computation to the global variable (step 828) and the process continues to step 834.

If the operation type is not a load operation, the mechanism of the present invention determines whether the operation type is a division or modulo operation (step 830). If the operation type is not a division or modulo operation, the process continues to step 834.

If the operation type is a division or modulo operation, the mechanism of the present invention inserts a store operation to calculate a magic number (step 832) and the process continues to step 834. Magic numbers are used for converting division by a constant operation into a short program that uses the most significant 32 bits of the 64 bit product of the dividend and the magic number.

At step 834, the mechanism of the present invention determines whether additional global variables are referenced by the selected candidate computation. If additional global variables are referenced, the process returns to step 822 to locate the next global variable. Otherwise, the process terminates thereafter.

Turning now to FIG. 9, a diagram illustrating an exemplary source program prior to inter-procedural strength reduction is depicted in accordance with a preferred embodiment of the present invention. As depicted in FIG. 9, in this example implementation, source program 900 includes an initialization procedure 902, a bar procedure 904, and foo procedure 914.

Initialization procedure 902 initializes global variables a, b, c, and d. Initialization procedure 902 is only executed once. Bar procedure 904 includes for loop 906. For loop 906 includes two computations, computations 908 and 910. For loop 906 iterates 1000 times and each time computations 908 and 910 are executed. Computation 908 evaluates expression 'x+=expr(a,b)'. Computation 910 evaluates expression 'y+=c/d'.

After computations 908 and 910 are executed, foo procedure 914 is called. Foo procedure 914 performs a store to global variables b and d ten times and a store to global variable c one thousand times.

When source program 900 is processed by the compiler, the compiler generates an intermediate representation for source program 900, such as a call graph, during the link phase. The mechanism of the present invention then traverses the call graph in a reverse depth first order to identify costly computations that only operate on global variables and constants.

In this example, within bar procedure 904, computation 908 only operates on global variables a and b and computation 910 only operates on global variables c and d. Therefore, the mechanism of the present invention adds computations 908 and 910 to the use list if computations 908 and 910 are not already in the list. Otherwise, the mechanism of the present invention updates the execution cost of computations 908 and 910 currently in the use list.

After computations are identified, the mechanism of the present invention identifies store locations where global variables are modified. In this example, initialization procedure 902 modifies global variables a, b, c, and d one time and foo procedure 914 modifies global variables b and d ten times as well as global variable c a thousand times.

Based on store locations identified, the mechanism of the present invention adds the global variables b, c and d to the def list if these variables are not already in the list. Otherwise, the mechanism of the present invention updates the execution cost of variables b, c, and d currently in the def list.

Turning now to FIG. 10A, a diagram illustrating an exemplary def list generated for source program 900 in FIG. 9 is depicted in accordance with a preferred embodiment of the present invention. As depicted in FIG. 10A, in this example implementation, def list 1000 includes four entries, entries 1002-1008.

Each entry includes two attributes, a symbol identification that identifies a global variable and a total execute cost identifying the number of times the global variable is modified in the whole program.

Certain global variables are excluded from the list, for example, global variables that are modified in an invisible portion of the program may not be included because it is impossible to perform pre-computation in the invisible portion of the program.

In this example, entry 1002 identifies global variable a and the execution cost of a, which is the execution count. In this example, the execution count of a is 1. Entry 1004 identifies global variable b with an execution count of 11. Entry 1006 identifies global variable c with an execution count of 1001. Entry 1008 identifies global variable d with an execution count of 11.

Turning now to FIG. 10B, a diagram illustrating an exemplary use list generated for source program 900 in FIG. 9 is depicted in accordance with a preferred embodiment of the present invention. As depicted in FIG. 10B, in this example implementation, use list 1020 includes two entries, entries 1022 and 1024.

Entry 1022 includes tree computation 1026 and execution count 1028. Tree computation 1026 identifies computation 908 in FIG. 9. Execution count 1028 represents the number of times computation 908 is executed, in this example, one thousand. Entry 1024 includes tree computation 1030 and execution count 1032. Tree computation 1030 represents computation 910 in FIG. 9. Execution count 1032 represents the number of times computation 910 is executed, in this example, also one thousand.

After def list 1000 and use list 1020 are generated, the mechanism of the present invention analyzes the collected information at the end of the forward pass and selects the candidate computations for inter-procedural strength reduction. The mechanism of the present invention examines the use list, such as use list 1020 in FIG. 10B, to select global variables that are referenced by the tree computations and compares execution count of the referenced global variable to the execution count of the tree computation.

If the execution count of the tree computation is much higher than the execution count of the global variable referenced, then inter-procedural strength reduction is possible to improve the performance of the compiled code. Referring to exemplary source program 900 in FIG. 9, computation 908 or 'x+=expr(a,b)' in bar procedure 904 is costly, but it cannot be moved out of for loop 906, since global variable b may change due to the call to foo procedure 914.

Thus, if the execution count of computation 908 or expr(a, b) in bar procedure 904 is much higher than the execution count of statements in which global variables a and b are referenced, inter-procedural strength reduction is possible to improve performance of execution of source program 900.

In this example, the execution count of computation 908 or expr(a,b) represented by tree computation 1022 is 1000 according to use list 1020 in FIG. 10B. The execution count of global variable a is 1 according to def list 1000 in FIG. 10A, which is a store operation in initialization procedure 902. The execution count of global variable b is 11 according to use list 1020 in FIG. 10A, which includes a store operation in initialization procedure 902 and ten store operations in foo procedure 914.

Based on the execution counts, the mechanism of the present invention determines that it is worthwhile to perform inter-procedural strength reduction because the execution counts of costly computation can be reduced from 1000 to 11 in the case of global variable b and from 1000 to 1 in the case of global variable a. The mechanism of the present invention then selects computation 908 or expr(a,b) as a candidate computation and creates a new global variable, isr1, and adds it to the use list.

Turning now to FIG. 11, a diagram illustrating an updated use list with selected candidate computations is depicted in accordance with a preferred embodiment of the present invention. As depicted in FIG. 11, use list 1100 includes three entries, entries 1102-1106. Entry 1102 is the same as entry 1022 in FIG. 10B except that a new global variable, isr1 1112, is created by the mechanism of the present invention to maintain the value of computation 908 or expr(a,b) after being selected as a candidate computation. In addition, a type of operation 'load' 1114 is also added to use list 1100 indicating that computation 908 or expr(a,b) will be replaced by a load of isr1 1112.

In addition to creating the new global variable, the mechanism of the present invention also initializes the global variable with initial values of the referenced variables. In this example, isr1 1112 is initialized with initial values of variables a and b.

Referring back to FIG. 10B, the mechanism of the present invention locates the next entry in the use list 1020, which is entry 1024. Entry 1024 includes tree computation 1030, c/d, which represents computation 910 or 'y+=c/d' in FIG. 9. Computation 910 is an expensive operation, since it is a division operation. On certain microprocessors, such as POWER4 processor available from International Business Machines Corporation, a division operation takes 36 cycles to process, compared to 5 cycles for multiplication and 2 cycles for addition.

After examining the execution count of global variables c and d from def list 1000 in FIG. 10A and the execution count of tree computation 1030 from use list 1020 in FIG. 10B, the mechanism of the present invention determines that global variable c and tree computation 1030 has roughly the same execution count, which is 1001 and 1000. Therefore, it may not be worthwhile to pre-compute the value of tree computation 1024.

The mechanism of the present invention continues to analyze sub-computation of tree computation 1030 for pre-computation optimization. When comparing the execution count of global variable d with execution count of tree computation 1030, the mechanism of the present invention determines that execution count of tree computation 1030 is much higher than execution count of global variable d, since d has an execution count of 11 and tree computation 1030 has an execution count of 1000. Therefore, it is worthwhile to pre-compute the value of 1/d.

Turning back to FIG. 11, after the mechanism of the present invention determines that tree computation 1030 is a candidate computation, new entry 1106 is created in use list 1100, which includes a tree computation 1115 or '1/d', a new global variable, isr1 1116, and a type of operation 'div_magic' 1118.

After selecting candidate computations for strength reduction, the mechanism of the present invention traverses the call graph in depth-first or bottom up order and replaces each selected candidate computation with a less costly or weaker computation, such as a load of new global variable if the operation type of the selected candidate computation is 'load' or a 'multiply-shift' of new global variable if the operation type is 'div_magic'.

In addition, for each global variable that is referenced by the selected candidate computation, the mechanism of the present invention inserts a store operation for each computation that references this global variable at all definition points in the whole program. If the operation type of selected computation is 'load', the mechanism of the present invention inserts a store operation to store the value of the selected candidate computation to the global variable. If the operation type of selected computation is 'div_magic', the mechanism of the present invention inserts a store operation to calculate a magic number.

Turning now to FIG. 12, a diagram illustrating optimized program for source program 900 in FIG. 9 is depicted in accordance with a preferred embodiment of the present invention. As depicted in FIG. 12, in this example, optimized program 1200 includes initialization procedure 1201, bar procedure 1206 and foo procedure 1212. For selected candidate computation expr(a,b), the mechanism of the present invention inserts store operation 1202 in initialization procedure 1201 and store operation 1214 in foo procedure 1212 to store the value of expr(a,b) to new global variable isr1.

Thus, each time global variable a or b is modified, the new global variable isr1 is updated. Furthermore, the mechanism of the present invention replaces selected candidate computation expr(a,b) in bar procedure 1206 by a simple load of the global variable isr1 1208.

For selected candidate computation '1/d', the mechanism of the present invention inserts store operation 1204 in initialization procedure 1201 and store operation 1216 in foo procedure 1212 to pre-compute magic numbers of division over d. The mechanism of the present invention then replaces computation 'c/d' in bar procedure 1206 with the multiply-shift operation on c 1210 by new global variable isr2 in the loop of bar procedure 904.

In summary, the present invention provides a method, apparatus and computer instructions optimizing software program using inter-procedural strength reduction. The present invention reduces the total number of costly computations in a program and replaces costly computations with less costly or weaker computations inter-procedurally.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A non-transitory computer readable medium storing a computer program product for optimizing a software program in a compiler during a link phase of generating an intermediate representation of the software program, wherein the intermediate representation comprises a call graph, which, when executed by a processor, performs a computer implemented method comprising:

collecting information for at least one global variable in the software program during a forward pass that traverses the call graph in a reverse depth-first order, wherein collecting information further comprises:

identifying a computation operating on the at least one global variable by determining whether the computation operates only on global variables and constants and further by, if the computation operates only on global variables and constants, updating a use list, wherein updating a use list includes: inserting the computation to the use list if the computation is not already in the use list; and updating an first execution cost of computation in the use list if the computation is already in the use list.; and identifying at least one store operation modifying the at least one global variable, wherein identifying comprises:

determining whether a store operation stores to the at least one global variable;

if the store operation stores to the at least one global variable, updating a def list, wherein updating the def list includes:

inserting the at least one global variable to the def list if the at least one global variable is not already in the def list; and updating an second execution cost of the at least one global variable in the def list if the at least one global variable is already in the def list;

analyzing collected information after the forward pass to form analyzed information, wherein analyzing collected information further comprises:

selecting the computation for strength reduction based on cost analysis of the software program, wherein selecting further comprises:

selecting at least one global variable referenced by the computation in a use list;

retrieving the second execution cost of the at least one global variable from the def list; and comparing the second execution cost of the at least one global variable and the first execution cost of the computation;

creating a second global variable of the computation; and initializing the second global variable, wherein the computation and the second global variable are part of the analyzed information, and wherein initializing further comprises initializing the second global variable using a value of the at least one global variable referenced by the computation; and after analyzing the collected information, modifying, using the analyzed information, the intermediate representation of the software program during a backward pass that traverses the call graph in a depth-first order, wherein modifying further comprises:

replacing the computation by one of a less costly computation relative to the first execution cost of the computation and a weaker computation relative to the first execution cost of the computation, and wherein the less costly computation and the weaker computation are a multiply-shift of the second global variable if the computation is a division operation; and inserting a store operation for each of the at least one global variable referenced the computation at all definition points of the at least one global variable in the software program, wherein inserting further comprises:

inserting a store operation to store a value of the computation to the second global variable if the computation is a load operation; and inserting a store operation to calculate a magic number if the computation is a division operation, wherein the magic number converts division by a constant operation into a short program that uses a most significant 32 bits of a 64 bit product of a dividend and the magic number;

wherein the method comprises a two-pass analysis using inter-procedural strength reduction.

2. A data processing system for optimizing a software program in a compiler during a link phase of generating an intermediate representation of the software program, wherein the intermediate representation comprises a call graph comprising:

a bus;

a processor connected to the bus;

a memory connected to the bus, wherein the memory a computer program product which, when executed by the processor, performs a computer implemented method comprising:

collecting information for at least one global variable in the software program during a forward pass that traverses the call graph in a reverse depth-first order, wherein collecting information further comprises:

identifying a computation operating on the at least one global variable by determining whether the computation operates only on global variables and constants and further by, if the computation operates only on global variables and constants, updating a use list, wherein updating a use list includes: inserting the computation to the use list if the computation is not already in the use list; and updating an first execution cost of computation in the use list if the computation is already in the use list.; and identifying at least one store operation modifying the at least one global variable, wherein identifying comprises:

determining whether a store operation stores to the at least one global variable;

if the store operation stores to the at least one global variable, updating a def list, wherein updating the def list includes:

inserting the at least one global variable to the def list if the at least one global variable is not already in the def list; and updating an second execution cost of the at least one global variable in the def list if the at least one global variable is already in the def list;

analyzing collected information after the forward pass to form analyzed information, wherein analyzing collected information further comprises:

selecting the computation for strength reduction based on cost analysis of the software program, wherein selecting further comprises:

selecting at least one global variable referenced by the computation in a use list;

retrieving the second execution cost of the at least one global variable from the def list; and comparing the second execution cost of the at least one global variable and the first execution cost of the computation;

creating a second global variable of the computation; and initializing the second global variable, wherein the computation and the second global variable are part of the analyzed information, and wherein initializing further comprises initializing the second global variable using a value of the at least one global variable referenced by the computation; and after analyzing the collected information, modifying, using the analyzed information, the intermediate representation of the software program during a backward pass that traverses the call graph in a depth-first order, wherein modifying further comprises:

replacing the computation by one of a less costly computation relative to the first execution cost of the computation and a weaker computation relative to the first execution cost of the computation, and wherein the less costly computation and the weaker computation are a multiply-shift of the second global variable if the computation is a division operation; and inserting a store operation for each of the at least one global variable referenced the computation at all definition points of the at least one global variable in the software program, wherein inserting further comprises:

inserting a store operation to store a value of the computation to the second global variable if the computation is a load operation; and inserting a store operation to calculate a magic number if the computation is a division operation, wherein the magic number converts division by a constant operation into a short program that uses a most significant 32 bits of a 64 bit product of a dividend and the magic number;

wherein the method comprises a two-pass analysis using inter-procedural strength reduction.

* * * * *